(12) United States Patent
Lee et al.

(10) Patent No.: US 10,718,891 B2
(45) Date of Patent: Jul. 21, 2020

(54) INPUT COUPLER, BACKLIGHT UNIT, AND THREE-DIMENSIONAL IMAGE DISPLAY APPARATUS INCLUDING THE INPUT COUPLER

(71) Applicant: SAMSUNG ELECTRONICS CO., LTD., Suwon-si (KR)

(72) Inventors: Sunghoon Lee, Seoul (KR); Joonyong Park, Suwon-si (KR); Dongouk Kim, Pyeongtaek-si (KR); Jihyun Bae, Seoul (KR); Bongsu Shin, Seoul (KR); Dongsik Shim, Hwaseong-si (KR); Jaeseung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 223 days.

(21) Appl. No.: 15/870,291

(22) Filed: Jan. 12, 2018

(65) Prior Publication Data

US 2018/0210130 A1    Jul. 26, 2018

(30) Foreign Application Priority Data

Jan. 20, 2017 (KR) .................. 10-2017-0009925

(51) Int. Cl.
*G03H 1/26*       (2006.01)
*F21V 8/00*       (2006.01)
(Continued)

(52) U.S. Cl.
CPC ......... *G02B 6/0031* (2013.01); *G02B 6/0066* (2013.01); *G02B 27/145* (2013.01);
(Continued)

(58) Field of Classification Search
CPC ........ G02B 6/002; G02B 6/003; G02B 6/005; G02B 6/006; G02B 6/009; G02B 6/0011;
(Continued)

(56) References Cited

U.S. PATENT DOCUMENTS 8,240,906 B2    8/2012   Kim et al.
2013/0155723 A1*  6/2013   Coleman .............. G02B 6/0018
                                                          362/621

(Continued)

FOREIGN PATENT DOCUMENTS

KR       100438522 B1    7/2004
KR    1020120003653 A    1/2012
(Continued)

*Primary Examiner* — Mustak Choudhury
(74) *Attorney, Agent, or Firm* — Sughrue Mion, PLLC

(57) ABSTRACT

An input coupler includes: a plurality of semi-reflectors located along an optical path along which a light incident from a light source travels, each of the plurality of semi-reflectors comprising a reflective surface that is inclined with respect to the optical path and configured to reflect a first portion of the light and transmit a second portion of the light; and a plurality of optical path changing members configured to change an optical path of the light transmitted through the plurality of semi-reflectors, wherein the plurality of semi-reflectors and the plurality of optical path changing members are arranged such that the light passing through at least one of the plurality of semi-reflectors and emitted in one direction has a linear beam distribution.

21 Claims, 9 Drawing Sheets

(51) Int. Cl.
   *G03H 1/22* (2006.01)
   *G02B 27/14* (2006.01)
   *G02B 30/26* (2020.01)

(52) U.S. Cl.
   CPC .......... *G02B 30/26* (2020.01); *G03H 1/2286* (2013.01); *G03H 1/2294* (2013.01); *G03H 1/268* (2013.01); *G02B 6/005* (2013.01); *G02B 6/0068* (2013.01); *G03H 2223/16* (2013.01)

(58) Field of Classification Search
   CPC .. G02B 6/0016; G02B 6/0018; G02B 6/0028; G02B 6/0031; G02B 6/0036; G02B 6/0065; G02B 6/0066; G02B 6/0068; G02B 6/0075; G02B 6/0076; G02B 6/0078; G02B 6/0085; G02B 6/0088; G02B 27/0081; G02B 27/0172; G02B 27/144; G02B 27/145; G02B 27/225; G03H 1/2286; G03H 1/2294; G03H 1/268; G03H 2223/16
   See application file for complete search history.

(56) References Cited

U.S. PATENT DOCUMENTS

2014/0314374 A1   10/2014  Fattal et al.
2015/0268399 A1    9/2015  Futterer
2016/0299345 A1   10/2016  Mukawa

FOREIGN PATENT DOCUMENTS

KR        101414605 B1    7/2014
WO      2016106987 A1    7/2016

\* cited by examiner

INPUT COUPLER, BACKLIGHT UNIT, AND THREE-DIMENSIONAL IMAGE DISPLAY APPARATUS INCLUDING THE INPUT COUPLER

CROSS-REFERENCE TO RELATED APPLICATION

This application claims priority from Korean Patent Application No. 10-2017-0009925, filed on Jan. 20, 2017 in the Korean Intellectual Property Office, the disclosure of which is incorporated herein by reference in its entirety.

BACKGROUND

1. Field

Apparatuses and methods consistent with exemplary embodiments relate to an input coupler for converting a point light source into a linear light source and a three-dimensional (3D) image display apparatus using the input coupler.

2. Description of the Related Art

Three-dimensional (3D) display apparatuses for providing realistic 3D images to viewers may be classified into binocular stereoscopic display apparatuses and autostereoscopic display apparatuses. Binocular stereoscopic display apparatuses provide 3D images by using binocular parallax that occurs when images with different viewpoints are observed by two eyes through special glasses, and have been actively studied because such binocular stereoscopic display apparatuses are easily implemented. However, since binocular stereoscopic display apparatuses have a fundamental problem in that users have to wear special glasses which are an inconvenience, the demand for autostereoscopic display apparatuses that may provide 3D images without special glasses has recently increased.

Autostereoscopic display apparatuses may be classified into display apparatuses using multiview 3D methods, display apparatuses using volumetric 3D methods, display apparatuses using integral imaging methods, and display apparatuses using holographic methods, according to principles. Recently, display apparatuses using multiview 3D methods have been actively studied. Multiview 3D methods involve forming a plurality of views in an eye space by sending different pieces of image information in various directions. Representative examples of multiview 3D methods include methods using parallel barriers, lenticular lenses, projections, and directional backlights.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide input couplers for converting point light sources into linear light sources and three-dimensional (3D) image display apparatuses using the input couplers.

According to an aspect of an exemplary embodiment, there is provided an input coupler including: a plurality of semi-reflectors located along an optical path along which a light incident from a light source travels, each of the plurality of semi-reflectors including a reflective surface that is inclined with respect to the optical path and configured to reflect a first portion of the light and transmit a second portion of the light; and a plurality of optical path changing members configured to change an optical path of the light transmitted through the plurality of semi-reflectors, wherein the plurality of semi-reflectors and the plurality of optical path changing members are arranged such that the light passing through at least one of the plurality of semi-reflectors and emitted in one direction has a linear beam distribution.

The plurality of semi-reflectors may include: a plurality of first semi-reflectors arranged along a first path that is parallel to a linear direction; and a plurality of second semi-reflectors arranged along a second path that is parallel to the first path.

The plurality of first semi-reflectors may be arranged in parallel to each other, and the plurality of second semi-reflectors may be arranged in parallel to each other.

The plurality of optical path changing members may include: a first optical path changing member configured to change a path of the light traveling along the first path into a third path; a second optical path changing member configured to change a path of the light traveling along the third path in the second path; and a third optical path changing member configured to change a path of the light traveling along the second path into a fourth path.

The first optical path changing member, the second optical path changing member, and the third optical path changing member may be arranged such that a connection of the first path, the second path, the third path, and the fourth path forms a circulation path.

The first optical path changing member may include a reflective surface that causes the first path and the second path to be perpendicular to each other.

The second optical path changing member may have a reflective surface that causes the third path and the second path to be perpendicular to each other.

The third optical path changing member may have a reflective surface that causes the second path and the fourth path to be perpendicular to each other.

The plurality of first semi-reflectors and the plurality of second semi-reflectors may be arranged such that the light reflected from each of the plurality of second semi-reflectors is respectively transmitted through and emitted from each of the plurality of first semi-reflectors facing the second semi-reflectors.

Reflective surfaces of the plurality of first semi-reflectors and reflective surfaces of the plurality of second semi-reflectors may face each other so as to be symmetric about a predetermined reference surface.

Reflective surfaces of the first semi-reflectors and reflective surfaces of the second semi-reflectors may be misaligned with each other about a predetermined reference surface.

The plurality of first semi-reflectors and the plurality of second semi-reflectors may be arranged such that the light reflected from the plurality of semi-reflectors is emitted in the one direction without passing through the plurality of first semi-reflectors.

A number and a reflectance of the plurality of semi-reflectors may be set so that a coupling uniformity and a coupling efficiency of the input coupler are greater than or equal to 50%.

A reflectance of the plurality of semi-reflectors may be less than or equal to 5%.

The input coupler may further include a housing including a transparent material and configured to fixedly support the plurality of semi-reflectors and the plurality of optical path changing members.

Each of the plurality of optical path changing members may have a prism form, and is integrally formed with the housing by using a same material.

According to an aspect of another exemplary embodiment, there is provided a backlight unit including: a light source; the input coupler configured to emit the light from the light source as a linear light; and a light guide plate including an incident surface on which the light from the input coupler is incident, a total reflection surface configured to totally reflect the light incident from the input coupler, and an emission surface facing the total reflection surface.

According to an aspect of another exemplary embodiment, there is provided a three-dimensional (3D) image display apparatus including: the backlight unit; and a spatial light modulator configured to diffract the light incident from the backlight unit and reproduce a holographic image based on the diffracted light.

According to an aspect of another exemplary embodiment, there is provided a backlight unit including: a light source; the input coupler configured to emit the light from the light source as a linear light; a light guide plate including an incident surface on which the light from the input coupler is incident, a total reflection surface configured to totally reflect the light incident from the input coupler, and an emission surface facing the total reflection surface; and a diffractive element located on the emission surface and configured to diffract the light to a plurality of viewing zones.

According to an aspect of another exemplary embodiment, there is provided a three-dimensional (3D) image display apparatus including: the backlight unit; and a display panel configured to modulate the light from the backlight unit according to image information.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
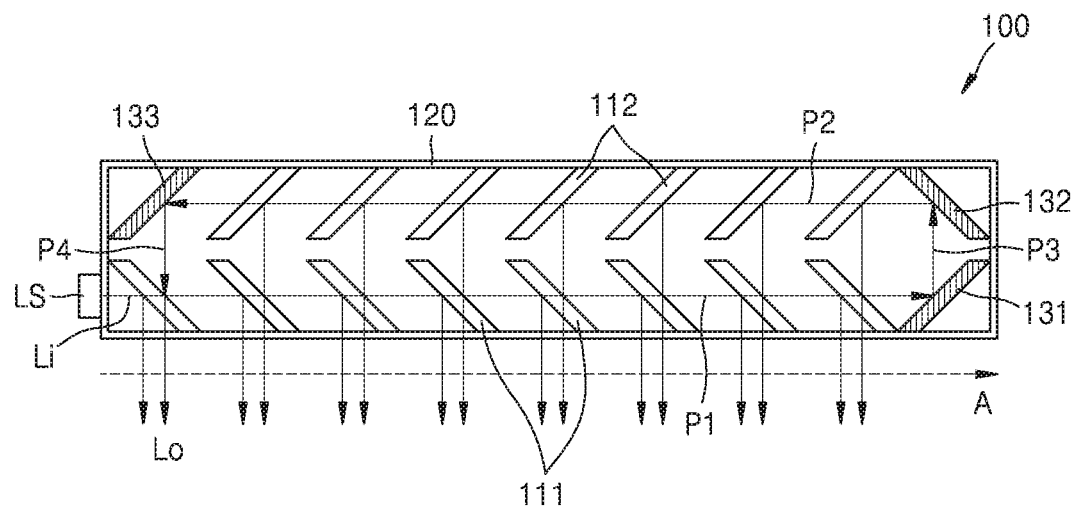
FIG. 1 is a cross-sectional view illustrating a configuration of an input coupler according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that when a layer is referred to as being "on" another layer, it may be directly on the other layer, or intervening layers may also be present therebetween.

While such terms as "first", "second", etc., may be used to describe various components, such components must not be limited to the above terms. The above terms are used only to distinguish one component from another.

As used herein, the singular forms "a", "an", and "the" are intended to include the plural forms as well, unless the context clearly indicates otherwise. It will be further understood that the terms "comprises" and/or "comprising" used herein specify the presence of stated components, but do not preclude the presence or addition of one or more other components.

In addition, terms such as " . . . unit", " . . . module", or the like refer to units that perform at least one function or operation, and the units may be implemented as hardware or software or as a combination of hardware and software.

Expressions such as "at least one of," when preceding a list of elements, modify the entire list of elements and do not modify the individual elements of the list.

FIG. 1 is a cross-sectional view illustrating a configuration of an input coupler 100 according to an exemplary embodiment.

The input coupler 100 may convert a light beam having a point light form into light having a linear beam distribution and may emit the light having the linear distribution. Light Li incident from a light source LS has a point light form, and light Lo emitted from the input coupler 100 has a linear beam distribution.

The input coupler 100 may include a plurality of semi-reflectors, such as first and second semi-reflectors 111 and 112, and is configured to reflect a portion of incident light and transmit another portion of the incident light. The input coupler 100 may also include a plurality of optical path changing members, such as first through third optical path changing members 131, 132, and 133, and each of the plurality of optical path changing members is configured to change a path of incident light.

The first and second semi-reflectors 111 and 112 and the first through third optical path changing members 131, 132, and 133 are arranged to convert the light Li incident from the light source LS into light having a linear beam distribution and emit the light having the linear beam distribution from the input coupler 100.

The first semi-reflectors 111 may be located along a first path P1 along which the light Li incident from the light source LS travels. Each of the first semi-reflectors 111 may have a reflective surface that is inclined with respect to the first path P1. The plurality of first semi-reflectors 111 may be arranged in parallel.

The second semi-reflectors 112 may be located along a second path P2 that is parallel to the first path P1, and may each have a reflective surface that is inclined with respect to the second path P2. The plurality of second semi-reflectors 112 may be arranged in parallel.

Each of the first and second semi-reflectors 111 and 112 may be formed of a material suitable for achieving a desired reflectance and a desired transmittance. For example, although each of the first and second semi-reflectors 111 and 112 is illustrated to have a single-layered structure for convenience, each of the first and second semi-reflectors 111 and 112 may have a multi-layered structure in which dielectric materials with different refractive indices are stacked, and a desired reflectance and a desired transmittance may be achieved by appropriately setting a refractive index of each layer or a number of the stacked layers.

The first optical path changing member 131 may change a path of light traveling along the first path P1 into a third path P3. The second optical path changing member 132 may change a path of light traveling along the third path P3 into the second path P2, and the third optical path changing member 133 may change a path of light traveling along the second path P2 into a fourth path P4.

The first optical path changing member 131, the second optical path changing member 132, and the third optical path changing member 133 may be configured and arranged so that the first path P1, the second path P2, the third path P3, and the fourth path P4 form a circulation path. For example, the first optical path changing member 131 may include a reflective surface that causes the first path P1 and the third path P3 to be perpendicular to each other. The second optical path changing member 132 may include a reflective surface that causes the third path P3 and the second path P2 to be perpendicular to each other, and the third optical path changing member 133 may include a reflective surface that causes the third path P3 and the fourth path P4 to be perpendicular to each other.

Each of the first through third optical path changing members 131, 132, and 133 may include a member having very high reflectance of incident light, for example, a reflective metal member or a mirror.

The first and second semi-reflectors 111 and 112 and the first through third optical path changing members 131, 132, and 133 may be fixedly arranged in a housing 120 that is transparent. Light may be transmitted through the housing 120, and the housing 120 may have any of various forms that may support the first and second semi-reflectors 111 and 112 and the first through third optical path changing members 131, 132, and 133.

In consideration of uniformity of the light Lo emitted from the input coupler 100, reflectance, an arrangement, and a number of the first semi-reflectors 111 and the second semi-reflectors 112 may be determined. The uniformity of the light Lo refers to uniformity of light intensity in a linear direction, that is, a direction marked by a dashed arrow A, in a linear beam distribution formed by the light Lo.

In the input coupler 100 according to an exemplary embodiment, the first semi-reflectors 111 and the second semi-reflectors 112 are arranged so that light reflected from the second semi-reflectors 112 passes through the first semi-reflectors 111 facing the second semi-reflectors 112 and is then emitted. The reflective surfaces of the first semi-reflectors 111 and the reflective surfaces of the second semi-reflectors 112 may face each other so as to be symmetric about a predetermined reference surface.

An optical path along which the light Li incident from the light source LS is emitted as the light Lo is as follows. A portion of the light Li is reflected and emitted from the first semi-reflector 111 and the rest of the light Li is transmitted through the first semi-reflector 111 and travels along the first path P1. Next, a portion of the rest of the light Li is reflected and emitted from the first semi-reflector 111 at a second position, and the rest of this light is transmitted through the first semi-reflector 111 at the second position and continuously travels along the first path P1. As such, light having the same intensity may be reflected and emitted from the first semi-reflectors 111, according to a given reflectance, at positions while passing through the plurality of first semi-reflectors 111 arranged along the first path P1.

Next, due to the first optical path changing member 131 and the second optical path changing member 132, the light is incident on the second semi-reflectors 112 arranged along the second path P2. A portion of the light is reflected from the second semi-reflector 112, is incident on the first semi-reflector 111 facing the second semi-reflector 112, and, according to a transmittance of the first semi-reflector 111, is transmitted and emitted through the first semi-reflector 111 facing the second semi-reflector 112 at the first position. As such, while passing through the plurality of second semi-reflectors 112 arranged along the second path P2, light having the same intensity is reflected from the second semi-reflectors 112, according to a reflectance of the second-reflectors 112, and is transmitted and emitted through the first semi-reflectors 111 facing the second semi-reflectors 112, according to a transmittance of the second semi-reflectors 112.

Next, due to the third optical path changing member 133, the light travels to the fourth path P4, and is then again transmitted and emitted through the first semi-reflector 111.

As such, light incident from the light source LS is sequentially transmitted through the plurality of first semi-reflectors 111, the first and second optical path changing members 131 and 132, the plurality of second semi-reflectors 112, and the third optical path changing member 133 arranged in the input coupler 100, and is emitted at a substantially constant ratio from each position. Accordingly, the light Lo may have a linear form having a uniform distribution in a direction marked by the dashed arrow A.

Table 1 shows a result obtained from a computer simulation of coupling efficiency and coupling uniformity according to reflectance of the first and second semi-reflectors 111 and 112 and a number of the first and second semi-reflectors 111 and 112 employed by the input coupler 100.

TABLE 1

| Semi-reflector reflectance [%] | Number of semi-reflectors: 20 | | Number of semi-reflectors: 100 | | Number of semi-reflectors: 200 | |
|---|---|---|---|---|---|---|
| | Coupling efficiency [%] | Coupling uniformity [%] | Coupling efficiency [%] | Coupling Uniformity [%] | Coupling efficiency [%] | Coupling uniformity [%] |
| 1 | 18.12 | 99.5 | 63.16 | 88.58 | 86.37 | 64.56 |
| 5 | 62.95 | 88.26 | 99.05 | 15.32 | 99.97 | 1.19 |
| 10 | 85.57 | 62.52 | 99.95 | 1.04 | ~100 | 0.01 |
| 20 | 96.93 | 21.76 | ~100 | ~0 | ~100 | ~0 |

The term 'coupling efficiency' may refer to a ratio between an amount of light emitted through the input coupler 100 to an amount of light incident from the light source LS. The term 'coupling uniformity' refers to a ratio of a minimum value to a maximum value of amounts of light emitted from each of the semi-reflectors constituting the input coupler 100.

Referring to Table 1, as reflectance of semi-reflectors increases, coupling efficiency increases and coupling uniformity decreases. Such a relationship varies according to the total number of semi-reflectors. Accordingly, the total number of semi-reflectors and reflectance of the semi-reflectors may be determined so that both coupling uniformity and coupling efficiency are equal to or greater than appropriate values. For example, in consideration of light efficiency and uniformity of emitted light, the number and reflectance of semi-reflectors may be set so that both coupling efficiency and coupling uniformity are equal to or greater than 50% or 60%. Alternatively, for example, since it is difficult to ensure appropriate uniformity as reflectance of semi-reflectors increases, reflectance of the semi-reflectors may be set to be equal to or less than 5%.

In the input coupler 100 of the present exemplary embodiment, although the first and second semi-reflectors 111 and 112 have the same reflectance and are arranged at equal intervals, exemplary embodiments are not limited thereto. Reflectance of the first semi-reflectors 111 may be different from reflectance of the second semi-reflectors 112, and intervals may be set so as not to be regular in consideration of the difference in reflectance of the first and second semi-reflectors 111 and 112.

Figure 2:
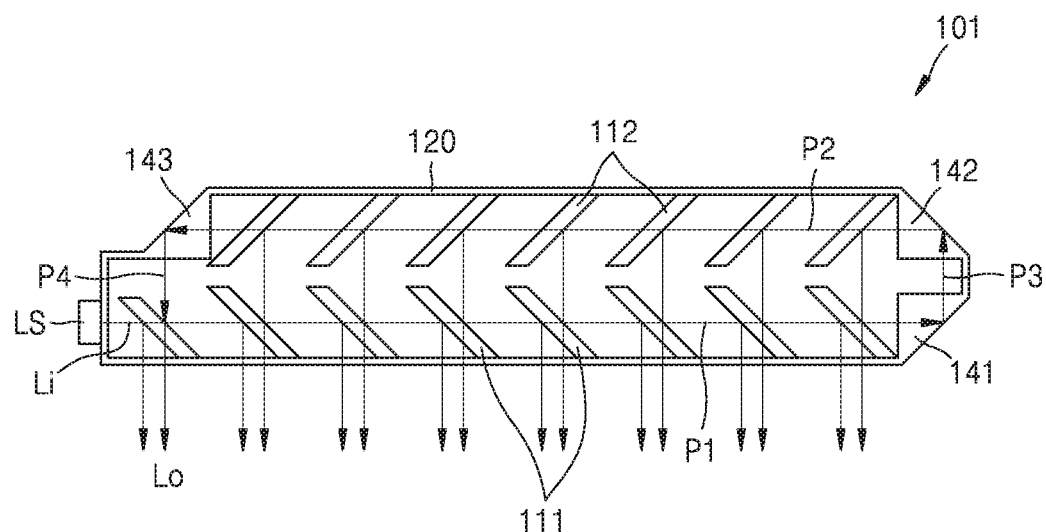
FIG. 2 is a cross-sectional view illustrating a configuration of an input coupler according to another exemplary embodiment.

FIG. 2 is a cross-sectional view illustrating a configuration of an input coupler 101 according to another exemplary embodiment.

The input coupler 101 is different from the input coupler 100 of FIG. 1 in that first through third optical path changing members 141, 142, and 143 are formed as prisms.

The first through third optical path changing members 141, 142, and 143 may be formed as prisms that totally reflect incident light. In consideration of an angle at which light is incident on the first through third optical path changing members 141, 142, and 143, a material having a refractive index equal to or greater than a predetermined value for total reflection may be used to form the prisms. The first through third optical path changing members 141, 142, and 143 may be integrally formed with the housing 120 by using the same material, but are not limited thereto.

Figure 3:
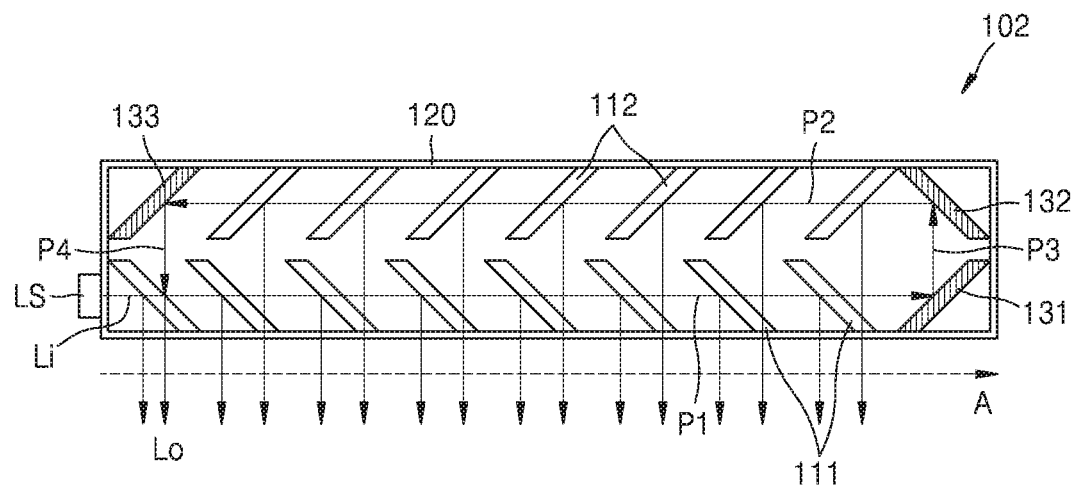
FIG. 3 is a cross-sectional view illustrating a configuration of an input coupler according to another exemplary embodiment.

FIG. 3 is a cross-sectional view illustrating a configuration of an input coupler 102 according to another exemplary embodiment.

The input coupler 102 is different from the input coupler 100 of FIG. 1 in that the first semi-reflectors 111 and the second semi-reflectors 112 are misaligned with each other. For example, the first semi-reflectors 111 may have positions different from the respective second semi-reflectors 112 in a longitudinal direction of the input coupler 102. The input coupler 102 is the same as the input coupler 100 of FIG. 1 in that light reflected from the second semi-reflectors 112 is transmitted and emitted through the first semi-reflectors 111, and uniformity of the light Lo may be increased by appropriately setting a misalignment distance between the first semi-reflectors 111 and the second semi-reflectors 112.

Figure 4:
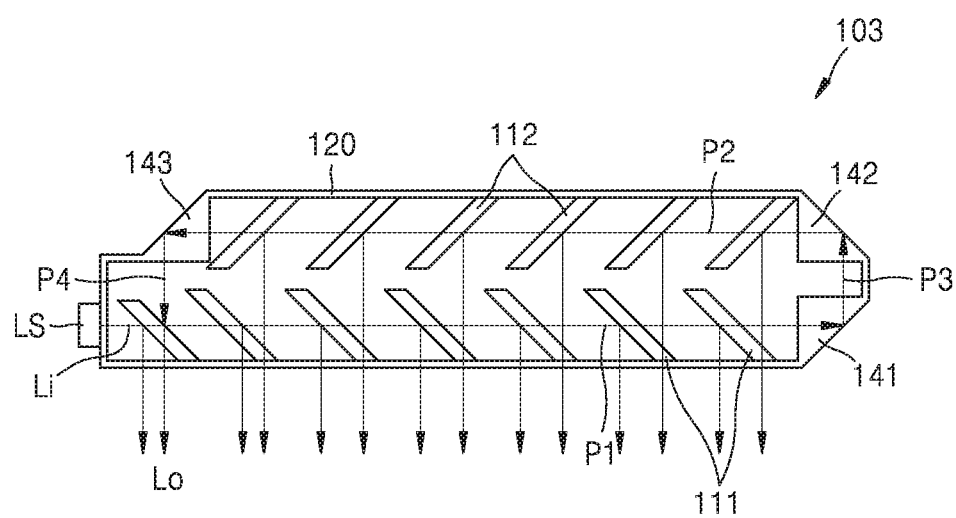
FIG. 4 is a cross-sectional view illustrating a configuration of an input coupler according to another exemplary embodiment.

FIG. 4 is a cross-sectional view illustrating a configuration of an input coupler 103 according to another exemplary embodiment.

The input coupler 103 is different from the input coupler 102 of FIG. 3 in that the first through third optical path changing members 141, 142, and 143 are formed as prisms.

The first through third optical path changing members 141, 142, and 143 may be formed as prisms that totally reflect incident light. In consideration of an angle at which light is incident on the first through third optical path changing members 141, 142, and 143, a material having a refractive index equal to or greater than a predetermined value for total reflection may be used to form the prisms. The first through third optical path changing members 141, 142, and 143 may be integrally formed with the housing 120 by using the same material, but are not limited thereto.

Figure 5:
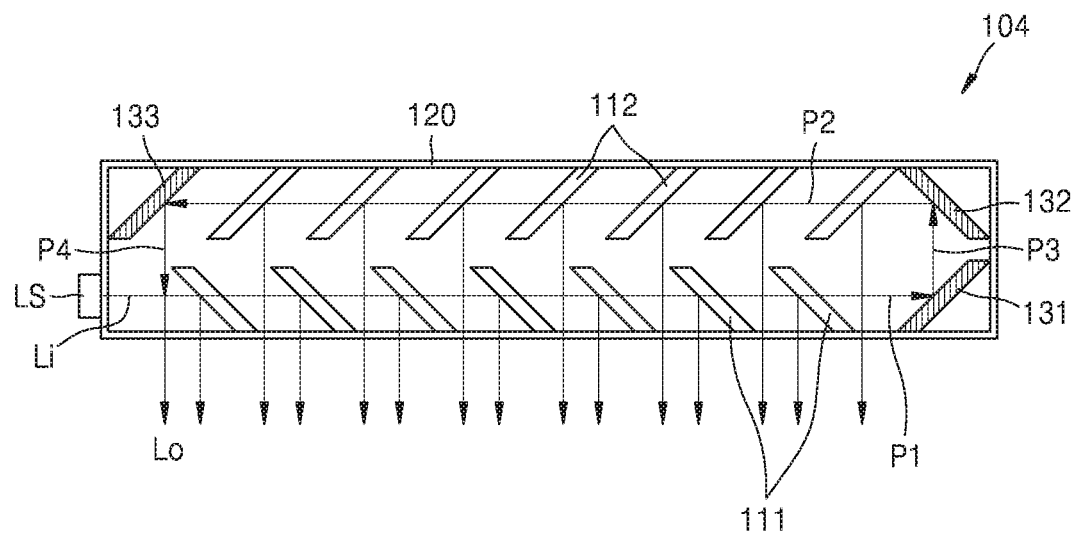
FIG. 5 is a cross-sectional view illustrating a configuration of an input coupler according to another exemplary embodiment.

FIG. 5 is a cross-sectional view illustrating a configuration of an input coupler 104 according to another exemplary embodiment.

The input coupler 104 is different from the input coupler 100 of FIG. 1 and the input coupler 102 of FIG. 3 in that the first semi-reflectors 111 and the second semi-reflectors 112 are misaligned with each other and light reflected from the second semi-reflectors 112 is emitted without passing through the first semi-reflectors 111. Uniformity of the light Lo may be increased by appropriately setting a misalignment distance between the first semi-reflectors 111 and the second semi-reflectors 112.

Figure 6:
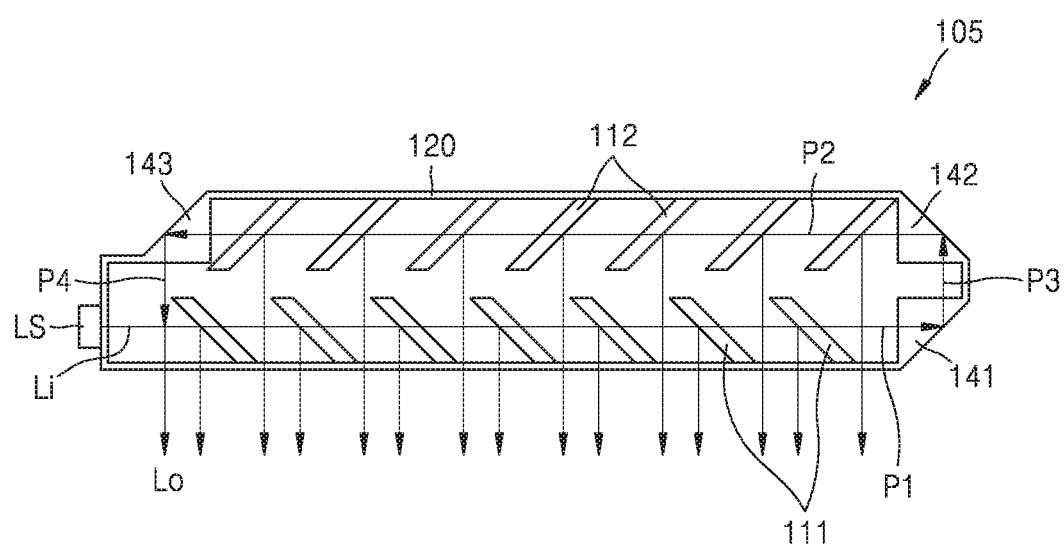
FIG. 6 is a cross-sectional view illustrating a configuration of an input coupler according to another exemplary embodiment.

FIG. 6 is a cross-sectional view illustrating a configuration of an input coupler 105 according to another exemplary embodiment.

The input coupler 105 is different from the input coupler 104 of FIG. 5 in that the first through third optical path changing members 141, 142, and 143 are formed as prisms.

The first through third optical path changing members 141, 142, and 143 may be formed as prisms that totally reflect incident light. The first through third optical path changing members 141, 142, and 143 may be integrally formed with the housing 120 by using the same material, but are not limited thereto.

Although the various input couplers 100, 101, 102, 103, 104, and 105 have been explained, exemplary embodiments are not limited thereto. In order to increase uniformity of an emitted linear beam, a modification or a combination of the input couplers 100, 101, 102, 103, 104, and 105 may be used.

Figure 7:
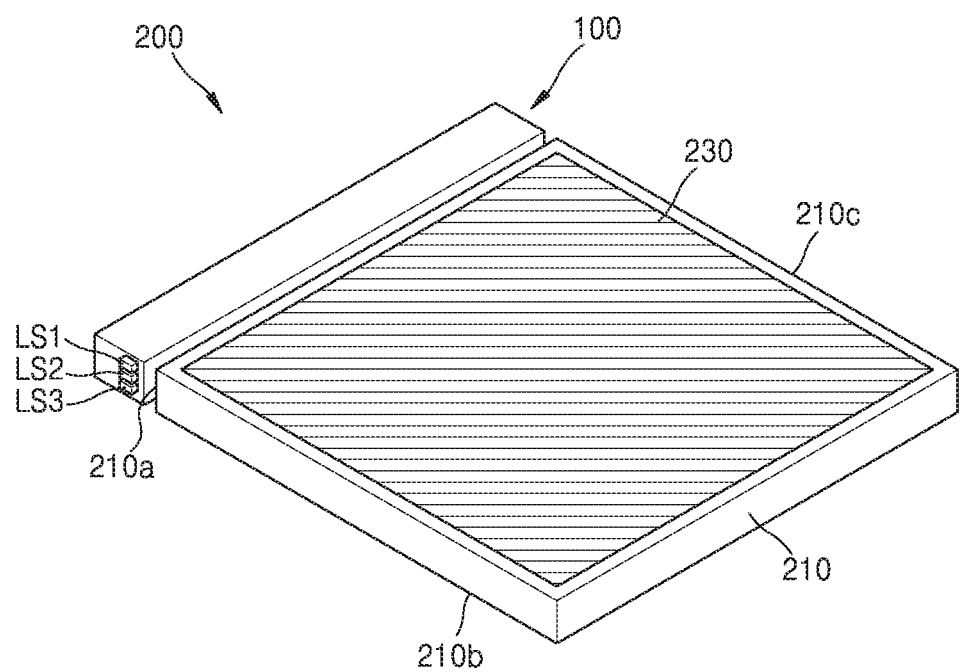
FIG. 7 is a perspective view illustrating a configuration of a backlight unit according to an exemplary embodiment.
Figure 8:
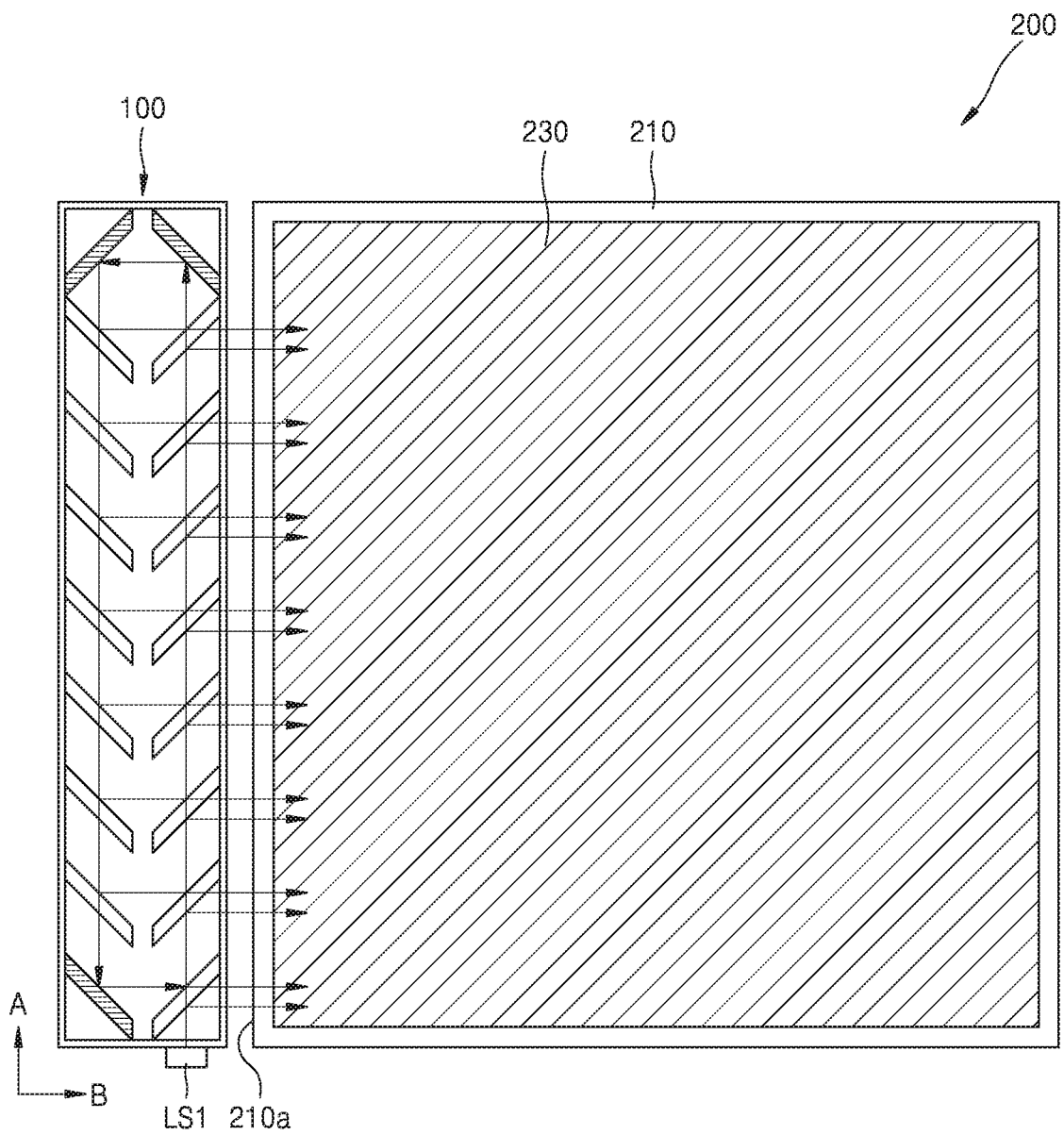
FIG. 8 is a plan view of the backlight unit of FIG. 7.

FIG. 7 is a perspective view illustrating a configuration of a backlight unit 200 according to an exemplary embodiment. FIG. 8 is a plan view of the backlight unit 200 of FIG. 7.

The backlight unit 200 for providing a coherent light beam as surface light for holographic display may include a plurality of light sources LS1, LS2, and LS3, the input coupler 100, and a light guide plate 210.

The backlight unit 200 may include a first light source LS1, a second light source LS2, and a third light source LS3 that provide coherent light beams of different wavelengths. A laser diode or a light-emitting diode (LED) may be used as each of the first light source LS1, the second light source LS2, and the third light source LS3. The first through third light sources LS1, LS2, and LS3 may respectively emit red light, blue light, and green light. The first through third light sources LS1, LS2, and LS3 may be time-sequentially driven.

The input coupler 100 emits light having a point light form from the first light source LS1, the second light source LS2, and the third light source LS3 as linear light to the light guide plate 210. Although the input coupler 100 is the input coupler 100 of FIG. 1, exemplary embodiments are not limited thereto, and any of the input couplers 101, 102, 103, 104, and 105 of FIGS. 2 through 6, or a modification or a combination thereof may be employed.

The light guide plate 210 converts a beam having a linear form incident from the input coupler 100 into surface light. The light guide plate 210 may enlarge, for example, linear light in a direction A along a direction B to form surface light. The light guide plate 210 may include an incident surface 210a, a total reflection surface 210b configured to totally reflect light and allow the light to travel in the light guide plate 210, and an emission surface 210c from which light is emitted. An output coupler 230 configured to emit light to the outside of the light guide plate 210 may be provided on the emission surface 210c. The output coupler 230 may be, for example, a diffractive optical element for diffracting and transmitting a portion of light.

Since the backlight unit 200 includes the input coupler 100 configured to convert light having a point light form into linear light and cause the linear light to be incident on the light guide plate 210, surface light having high uniformity may be provided.

Figure 9:
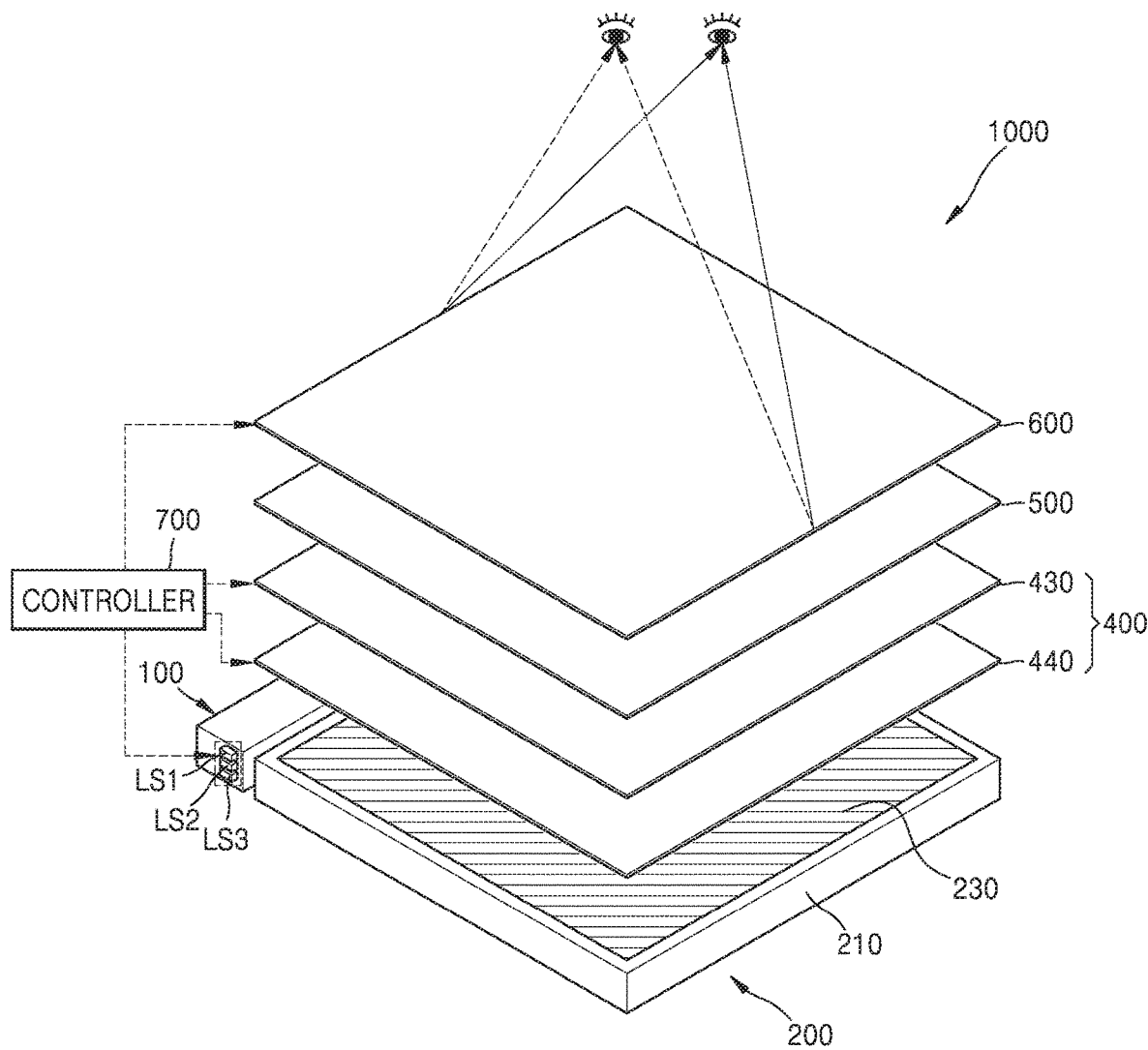
FIG. 9 is a perspective view illustrating a configuration of a three-dimensional (3D) image display apparatus employing the backlight unit of FIG. 7, according to an exemplary embodiment.

FIG. 9 is a perspective view illustrating a configuration of a three-dimensional (3D) image display apparatus 1000 employing the backlight unit 200 of FIG. 7.

The 3D image display apparatus 1000 uses a holographic method, and includes the backlight unit 200 and a spatial light modulator 600 configured to diffract light from the backlight unit 200 and reproduce a holographic image.

The 3D image display apparatus 1000 may further include a beam deflector 400 configured to two-dimensionally control a direction in which a light beam emitted from the backlight unit 200 travels and a field lens 500 configured to focus a holographic image reproduced by the spatial light modulator 600 onto a predetermined space.

When a computer-generated hologram (CGH) is input as an electrical signal to the spatial light modulator 600, the spatial light modulator 600 may reproduce a 3D image by forming a holographic pattern and diffracting incident light according to the input CGH. The spatial light modulator 600 reproduces a holographic image by diffracting light according to each color image information, in synchronization with portions of surface light of different wavelengths time-sequentially provided from the backlight unit 200. The reproduced holographic image is deflected to left and right eyes under the control of the beam deflector 400.

The beam deflector 400 may two-dimensionally control a direction in which a light beam emitted from the backlight unit 200 travels. To this end, the beam deflector 400 may include a first beam deflector 440 and a second beam deflector 430. The first beam deflector 440 and the second beam deflector 430 may be configured to control light beams in perpendicular directions. A position at which a holographic image is focused may be adjusted by the beam deflector 400. In other words, a left-eye position at which a left-eye holographic image is focused and a right-eye position at which a right-eye holographic image is focused may be adjusted by the beam deflector 400.

The 3D image display apparatus 1000 may further include a controller 700 configured to control synchronization of a process of sequentially providing light from the backlight unit 200 and a process by which the spatial light modulator 600 forms a holographic pattern, and configured to control the beam deflector 400 to control a direction in which a light beam travels.

The 3D image display apparatus 1000 according to an exemplary embodiment is a holographic display apparatus using a binocular holographic method, and may provide holographic images with different viewpoints to the left and right eyes of an observer. Since the 3D image display apparatus 1000 forms a left-eye holographic image and a right-eye holographic image at positions of a predetermined space, that is, a left-eye viewing zone and a right-eye viewing zone of the observer, the depth perceived by the brain and the focus of the eyes may be the same, and full parallax may be provided. Since viewpoint information other than viewpoint information that may be recognized by the observer does not need to be processed, the amount of data to be processed may be reduced.

Figure 10:
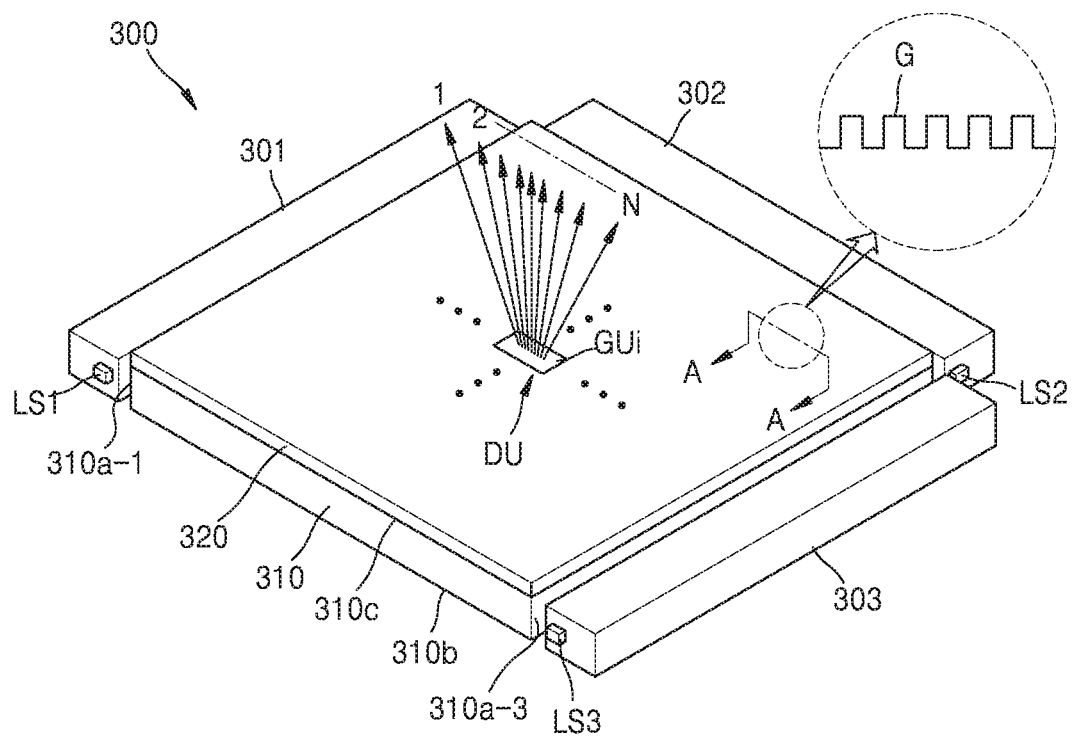
FIG. 10 is a perspective view illustrating a configuration of a backlight unit according to another exemplary embodiment.
Figure 11:
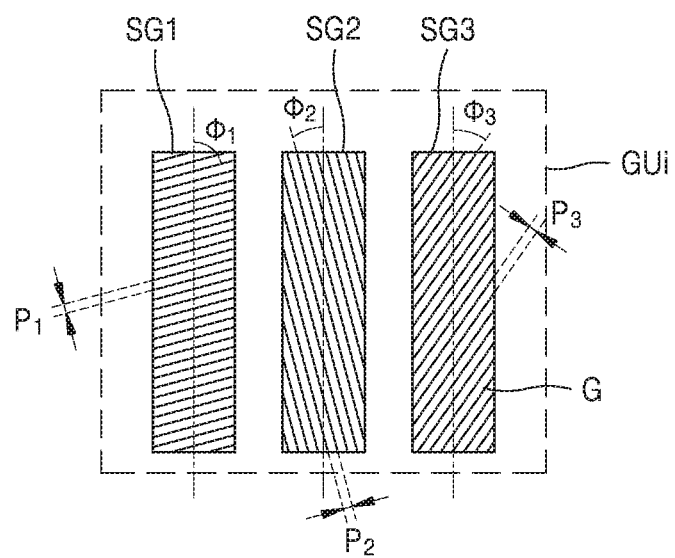
FIG. 11 is a plan view illustrating a detailed structure of a grating unit provided in a diffractive element of the backlight unit of FIG. 10, according to an exemplary embodiment.
Figure 12:
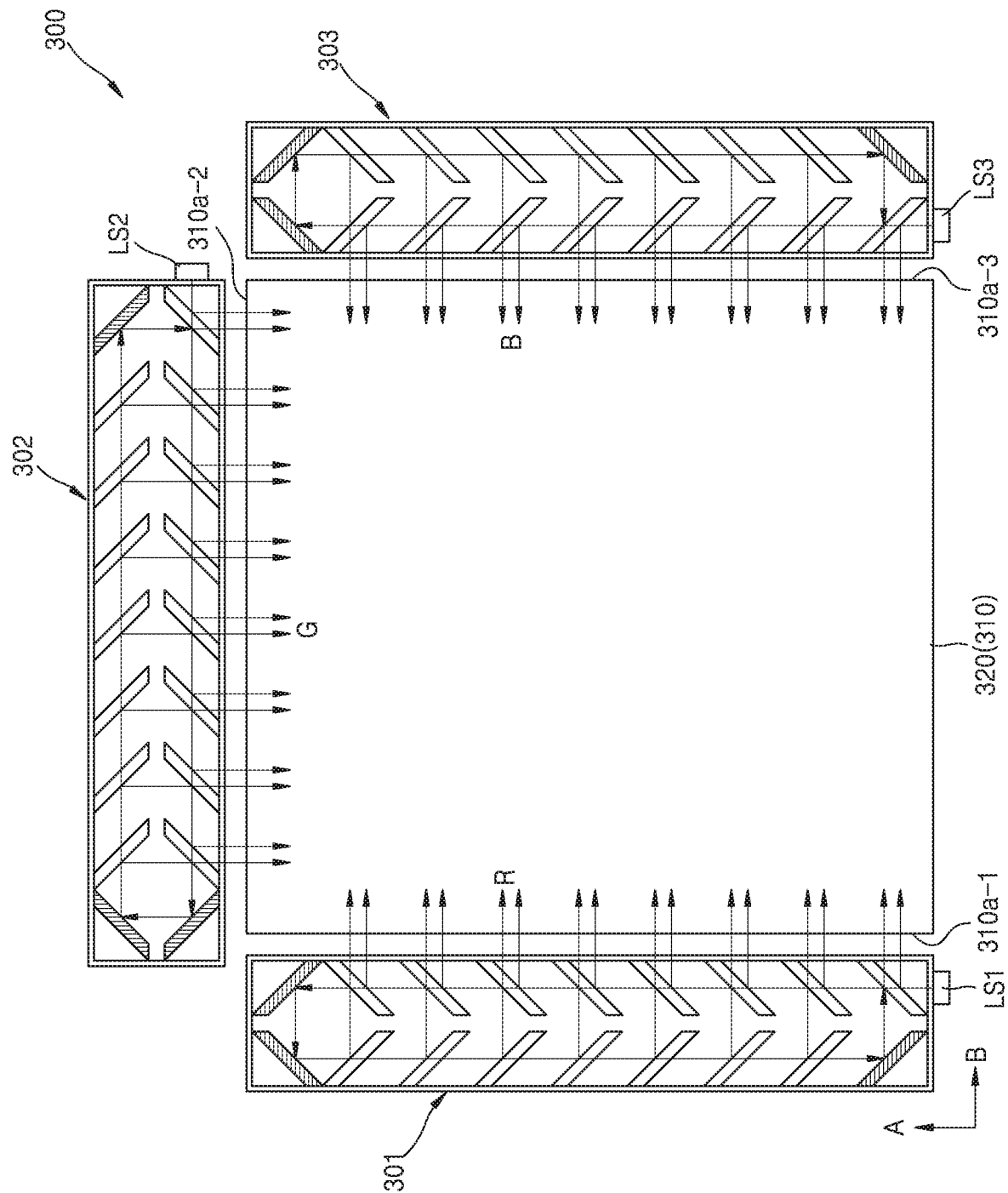
FIG. 12 is a plan view of the backlight unit of FIG. 10.

FIG. 10 is a perspective view illustrating a configuration of a backlight unit 300 according to another exemplary embodiment. FIG. 11 is a plan view illustrating a detailed structure of a grating unit provided in a diffractive element 320 of the backlight unit 300 of FIG. 10. FIG. 12 is a plan view of the backlight unit 300 of FIG. 10.

The backlight unit 300 according to the present exemplary embodiment may be a directional backlight unit that may be applied to a 3D image display apparatus using a multiview method. The backlight unit 300 includes a light guide plate 310 including a first incident surface 310a-1 on which light is incident, a total reflection surface 310b configured to totally reflect incident light, and an emission surface 310c facing the total reflection surface 310b; the first light source LS1 located adjacent to the first incident surface 310a-1; a first input coupler 301 configured to emit light from the first light source LS1 to the first incident surface 310a-1 as linear light; and the diffractive element 320 located on the emission surface 310c of the light guide plate 310 and configured to diffract light to a plurality of viewing zones.

The backlight unit 300 may further include a second input coupler 302 and the second light source LS2 configured to cause linear light to be incident on a second incident surface 310a-2 of the light guide plate 310, and a third input coupler 303 and the third light source LS3 configured to cause linear light to be incident on a third incident surface 310a-3 of the light guide plate 310. Any of the input couplers 100, 101, 102, 103, 104, and 105 of FIGS. 1 through 6, or a modification or a combination thereof, may be employed as the first through third input couplers 301, 302, and 303. The first through third light sources LS1, LS2, and LS3 provide portions of light of different wavelengths, for example, red light, green light, and blue light.

The diffractive element 320 includes a plurality of diffractive element units DU which include various gratings G and are repeatedly arranged. The diffractive element units DU include grating patterns that may diffract light to a plurality of viewing zones, and grating units GUi (i=1, . . . , N) including grating pattern sets in a number which is the same as the number of the plurality of viewing zones.

Each of the grating units GUi provided in the diffractive element units DU is formed so that an interaction occurs between the gratings G and light with a specific wavelength, and light is emitted in a specific direction according to a combination of a pitch of the gratings G, an arrangement direction of the gratings G, a duty cycle of the gratings G, and a relative angle between a direction in which light travels and the gratings G.

Each of the grating units GUi may include a plurality of sub-grating units, e.g., first through third sub-grating units SG1, SG2, and SG3, as shown in FIG. 11. The first through third sub-grating units SG1, SG2, and SG3 may each include a grating pattern depending on a wavelength band of light. For example, the first sub-grating unit SG1 may include a grating pattern for diffracting light of a first wavelength (e.g., light of a red wavelength band). The second sub-grating unit SG2 may include a grating pattern for diffracting light of a second wavelength (e.g., light of a green wavelength band). The third sub-grating unit SG3 may include a grating pattern for diffracting light of a third wavelength (e.g., light of a blue wavelength band).

The first through third sub-grating units SG1, SG2, and SG3 may include the gratings G with different arrangement cycles and different arrangement directions. The grating G of the first sub-grating unit SG1 may have a pitch $P_1$ and an angle $\Phi_1$ between an arrangement direction and a predetermined reference line. The grating G of the second sub-grating unit SG2 may have a pitch $P_2$ and an angle $\Phi_2$ indicating an arrangement direction. The grating G of the third sub-grating unit SG3 may have a pitch $P_3$ and an angle $\Phi_3$ indicating an arrangement direction. Since the first through third sub-grating units SG1, SG2, and SG3 included in the same grating unit GUi have a directivity toward the same viewing zone and correspond to portions of light of different wavelengths, a pitch $P_{ij}$ and an arrangement direction $\Phi_{ij}$ is determined so that the portions of light of different wavelengths may be applied. Although the first through third sub-grating units SG1, SG2, and SG3 have different arrangement directions and different arrangement cycles in FIG. 11, exemplary embodiments are not limited thereto. The gratings G included in the first through third sub-grating units SG1, SG2, and SG3 may be different in at least one from among the arrangement direction $\Phi_i$ and an arrangement cycle $P_i$.

Portions of light of different wavelengths emitted from the first through third light sources LS1, LS2, and LS3 are converted into portions of linear light by the first through third input couplers 301, 302, and 303, are incident on the light guide plate 310, are guided by total reflection at the total reflection surface 310b of the light guide plate 310, travel in the light guide plate 310, and are incident on the diffractive element 320 formed on the emission surface 310c of the light guide plate 310. Since the diffractive element units DU that are repeatedly formed on the diffractive element 320 operate for portions of light of different wavelengths and include grating patterns providing a directivity toward different viewing zones, incident light has a directivity toward N different viewing zones due to the grating patterns formed at positions.

Figure 13:
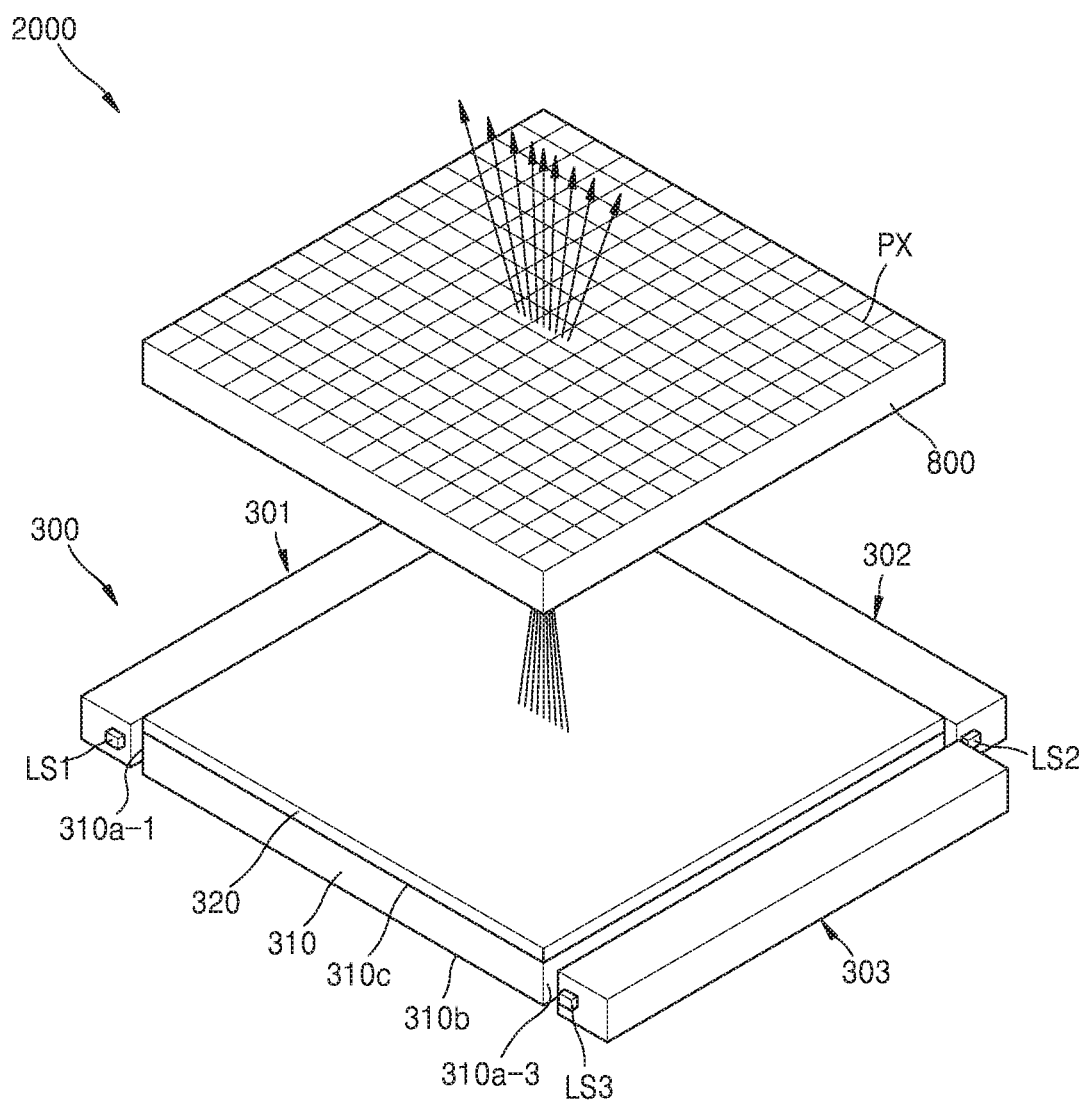
FIG. 13 is a perspective view illustrating a configuration of a 3D image display apparatus employing the backlight unit of FIG. 10, according to an exemplary embodiment.

FIG. 13 is a perspective view illustrating a configuration of a 3D image display apparatus 2000 employing the backlight unit 300 of FIG. 10.

The 3D image display apparatus 2000 includes the backlight unit 300 and a display panel 800.

The display panel 800 displays a 3D image by modulating light emitted from the directional backlight unit 300 according to 3D image information.

The display panel 800 includes a plurality of pixel regions PX that are independently controlled, and light having a directivity due to a diffractive element of the backlight unit 300 is incident on the pixel regions PX of the display panel 800. Light incident on the pixel regions PX may be appropriately modulated according to a directivity to display a 3D image.

The above-described input coupler may emit light incident as point light as linear light with high uniformity.

The input coupler may be applied to a surface light source apparatus for forming a 3D image using a holographic method or a directional backlight unit for forming a 3D image using a multiview method, and thus a high-quality 3D image may be formed.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An input coupler comprising:
 a plurality of semi-reflectors located along an optical path along which a light incident from a light source travels, each of the plurality of semi-reflectors comprising a reflective surface that is inclined with respect to the optical path and configured to reflect a first portion of the light and transmit a second portion of the light; and
 a plurality of optical path changing members configured to change the optical path of the light transmitted through the plurality of semi-reflectors,
 wherein the plurality of semi-reflectors and the plurality of optical path changing members are arranged such that the light passing through at least one of the plurality of semi-reflectors and emitted in one direction has a linear beam distribution,
 wherein the plurality of semi-reflectors comprise: a plurality of first semi-reflectors arranged along a first path that is parallel to a linear direction; and a plurality of second semi-reflectors arranged along a second path that is parallel to the first path.

2. The input coupler of claim 1, wherein the plurality of first semi-reflectors are arranged in parallel to each other, and
 the plurality of second semi-reflectors are arranged in parallel to each other.

3. The input coupler of claim 1, wherein the plurality of optical path changing members comprise:
 a first optical path changing member configured to change a path of the light traveling along the first path into a third path;
 a second optical path changing member configured to change a path of the light traveling along the third path in the second path; and
 a third optical path changing member configured to change a path of the light traveling along the second path into a fourth path.

4. The input coupler of claim 3, wherein the first optical path changing member, the second optical path changing member, and the third optical path changing member are arranged such that a connection of the first path, the second path, the third path, and the fourth path forms a circulation path.

5. The input coupler of claim 4, wherein the first optical path changing member comprises a reflective surface that causes the first path and the second path to be perpendicular to each other.

6. The input coupler of claim 4, wherein the second optical path changing member has a reflective surface that causes the third path and the second path to be perpendicular to each other.

7. The input coupler of claim 4, wherein the third optical path changing member has a reflective surface that causes the second path and the fourth path to be perpendicular to each other.

8. The input coupler of claim 1, wherein the plurality of first semi-reflectors and the plurality of second semi-reflectors are arranged such that the light reflected from each of the plurality of second semi-reflectors is respectively transmitted through and emitted from each of the plurality of first semi-reflectors facing the second semi-reflectors.

9. The input coupler of claim 8, wherein reflective surfaces of the plurality of first semi-reflectors and reflective surfaces of the plurality of second semi-reflectors face each other so as to be symmetric about a predetermined reference surface.

10. The input coupler of claim 8, wherein reflective surfaces of the first semi-reflectors and reflective surfaces of the second semi-reflectors are misaligned with each other about a predetermined reference surface.

11. The input coupler of claim 1, wherein the plurality of first semi-reflectors and the plurality of second semi-reflectors are arranged such that the light reflected from the plurality of semi-reflectors is emitted in the one direction without passing through the plurality of first semi-reflectors.

12. The input coupler of claim 1, wherein a number and a reflectance of the plurality of semi-reflectors are set so that a coupling uniformity and a coupling efficiency of the input coupler are greater than or equal to 50%.

13. The input coupler of claim 1, wherein a reflectance of the plurality of semi-reflectors is less than or equal to 5%.

14. The input coupler of claim 1, further comprising a housing comprising a transparent material and configured to fixedly support the plurality of semi-reflectors and the plurality of optical path changing members.

15. The input coupler of claim 14, wherein each of the plurality of optical path changing members has a prism form, and is integrally formed with the housing by using a same material.

16. A backlight unit comprising:
a light source;
the input coupler of claim 1 configured to emit the light from the light source as a linear light; and
a light guide plate comprising an incident surface on which the light from the input coupler is incident, a total reflection surface configured to totally reflect the light incident from the input coupler, and an emission surface facing the total reflection surface.

17. A three-dimensional (3D) image display apparatus comprising:
the backlight unit of claim 16; and
a spatial light modulator configured to diffract the light incident from the backlight unit and reproduce a holographic image based on the diffracted light.

18. A backlight unit comprising:
a light source;
the input coupler of claim 1 configured to emit the light from the light source as a linear light;
a light guide plate comprising an incident surface on which the light from the input coupler is incident, a total reflection surface configured to totally reflect the light incident from the input coupler, and an emission surface facing the total reflection surface; and
a diffractive element located on the emission surface and configured to diffract the light to a plurality of viewing zones.

19. A three-dimensional (3D) image display apparatus comprising:
the backlight unit of claim 18; and
a display panel configured to modulate the light from the backlight unit according to image information.

20. An input coupler comprising:
a plurality of first semi-reflectors disposed on a first surface of the input coupler along an optical path along which a light incident from a light source travels;
a plurality of second semi-reflectors disposed on a second surface of the input coupler that opposes the first surface of the input coupler along the optical path of the light;
a first optical path changing member disposed on the first surface and configured to change the optical path of the light transmitted through the plurality of first semi-reflectors; and
a second optical path changing member disposed on the second surface and configured to change the optical path of the light incident from the first optical path changing member,
wherein each of the plurality of first semi-reflectors and the plurality of second semi-reflectors comprises a reflective surface that is inclined with respect to the optical path and configured to reflect a first portion of the light and transmit a second portion of the light,
wherein the first optical path changing member on the first surface of the input coupler is disposed to be parallel to the plurality of second semi-reflectors on the second surface of the input coupler that opposes the first surface of the input coupler.

21. The input coupler of claim 20, wherein the second optical path changing member on the second surface of the input coupler is disposed to be parallel to the plurality of first semi-reflectors on the first surface opposing the second surface of the input coupler.

* * * * *